(12) United States Patent
Everett et al.

(10) Patent No.: US 8,983,707 B2
(45) Date of Patent: Mar. 17, 2015

(54) MACHINE CONTROL SYSTEM HAVING AUTONOMOUS DUMP QUEUING

(75) Inventors: Bryan J. Everett, Peoria, IL (US); Craig L. Koehrsen, East Peoria, IL (US); Eric A. Moughler, Germantown Hills, IL (US); Mark H. Banham, Victoria Point (AU)

(73) Assignee: Caterpillar Inc., Peoria, IL (US)

( * ) Notice: Subject to any disclaimer, the term of this patent is extended or adjusted under 35 U.S.C. 154(b) by 377 days.

(21) Appl. No.: 13/198,380

(22) Filed: Aug. 4, 2011

(65) Prior Publication Data

US 2012/0136523 A1 May 31, 2012

Related U.S. Application Data

(60) Provisional application No. 61/418,303, filed on Nov. 30, 2010.

(51) Int. Cl.
*G01C 22/00* (2006.01)
*G05D 1/00* (2006.01)
(Continued)

(52) U.S. Cl.
CPC ............ *G05D 1/0291* (2013.01); *E02F 9/2045* (2013.01); *E02F 9/2054* (2013.01); *G05D 1/0274* (2013.01); *G05D 1/0278* (2013.01); *G05D 2201/0202* (2013.01)
USPC .................................. 701/24; 701/23; 701/50

(58) Field of Classification Search
CPC ..... G05D 1/00; G05D 1/0027; G05D 1/0291; G05D 1/0297
USPC .................................. 701/23, 24, 25, 26, 50
See application file for complete search history.

(56) References Cited

U.S. PATENT DOCUMENTS

| 4,600,999 A | 7/1986 | Ito et al. |
|---|---|---|
| 5,005,652 A | 4/1991 | Johnson |

(Continued)

FOREIGN PATENT DOCUMENTS

| EP | 1414002 | 4/2004 |
|---|---|---|
| GB | 2448972 | 11/2008 |

OTHER PUBLICATIONS

U.S. Patent Application of Bryan J. Everett et al. entitled "Machine Control System Having Autonomous Resource Queuing," filed Aug. 4, 2011.

(Continued)

*Primary Examiner* — Calvin Cheung
*Assistant Examiner* — Lail Kleinman
(74) *Attorney, Agent, or Firm* — Finnegan, Henderson, Farabow, Garrett & Dunner, LLP (57) ABSTRACT

A control system for use at a dump location having a plurality of dump sites is disclosed. The control system may have a control module associated with a mobile machine and a worksite controller. The worksite controller may be configured to receive a signal from the control module indicative of the mobile machine crossing a boundary at a dump location, and assign a travel route for the mobile machine based on the signal. The travel route may include a travel segment on a common entrance row, a first single-use path from the common entrance row to a particular one of the plurality of dump sites, a second single-use path from the particular one of the plurality of dump sites to a common exit row, and a travel segment on the common exit row. The worksite controller may be further configured to communicate the travel route to the control module as the mobile machine moves toward the dump location.

30 Claims, 3 Drawing Sheets

(51) Int. Cl.
*G05D 1/02* (2006.01)
*E02F 9/20* (2006.01)

(56) References Cited

U.S. PATENT DOCUMENTS

| | | | |
|---|---|---|---|
| 5,375,663 | A | 12/1994 | Teach |
| 5,548,397 | A | 8/1996 | Kool et al. |
| 5,586,030 | A * | 12/1996 | Kemner et al. .................. 701/23 |
| 5,913,914 | A | 6/1999 | Kemner et al. |
| 5,925,081 | A | 7/1999 | Hawkins et al. |
| 5,931,875 | A * | 8/1999 | Kemner et al. .................. 701/23 |
| 5,961,560 | A | 10/1999 | Kemner |
| 6,128,574 | A | 10/2000 | Diekhans |
| 6,134,493 | A * | 10/2000 | Kaneko ........................... 701/50 |
| 6,236,924 | B1 | 5/2001 | Motz et al. |
| 6,246,932 | B1 | 6/2001 | Kageyama et al. |
| 6,292,725 | B1 * | 9/2001 | Kageyama et al. ............. 701/23 |
| 6,356,820 | B1 * | 3/2002 | Hashimoto et al. ............. 701/23 |
| 6,363,632 | B1 | 4/2002 | Stentz et al. |
| 6,600,553 | B1 | 7/2003 | Stone |
| 7,516,563 | B2 | 4/2009 | Koch |
| 2002/0143461 | A1 * | 10/2002 | Burns et al. ................... 701/117 |
| 2004/0068352 | A1 | 4/2004 | Anderson |
| 2004/0158355 | A1 | 8/2004 | Holmqvist et al. |
| 2006/0069472 | A1 | 3/2006 | Makela |
| 2006/0149465 | A1 | 7/2006 | Park et al. |
| 2008/0109127 | A1 * | 5/2008 | Ozaki ............................. 701/24 |
| 2008/0195270 | A1 * | 8/2008 | Diekhans et al. ............... 701/26 |
| 2009/0076674 | A1 | 3/2009 | Kiegerl et al. |
| 2009/0216410 | A1 * | 8/2009 | Allen et al. ..................... 701/50 |
| 2010/0076640 | A1 | 3/2010 | Maekawa et al. |

OTHER PUBLICATIONS

U.S. Patent Application of Bryan J. Everett et al. entitled "Control System Having Tool Tracking," filed Aug. 4, 2011.

U.S. Patent Application of Bryan J. Everett et al. entitled "System for Autonomous Path Planning and Machine Control," filed Aug. 4, 2011.

U.S. Patent Application of Bryan J. Everett et al. entitled "System for Automated Excavation Planning and Control," filed Aug. 4, 2011.

* cited by examiner

MACHINE CONTROL SYSTEM HAVING AUTONOMOUS DUMP QUEUING

RELATED APPLICATIONS

This application is based on and claims the benefit of priority from U.S. Provisional Application No. 61/418,303 by Bryan J. EVERETT, Craig L. KOEHRSEN, Eric A. MOUGHLER, and Mark H. BANHAM, filed Nov. 30, 2010, the contents of which are expressly incorporated herein by reference.

TECHNICAL FIELD

The present disclosure relates generally to an autonomous machine control system, and more particularly, to a system for autonomously queuing dumping of mobile machines and for controlling the mobile machines during the dumping based on the queuing.

BACKGROUND

Mobile machines such as haul trucks, scrapers, wheel loaders, and other types of heavy equipment are often used to haul material from a load location at which the material is loaded into the machines, to a dump location at which the material is discarded from the machines into separate piles. In order to maintain productivity and efficiency at a worksite while accomplishing predetermined site goals, travel of the machines at the dump location and positioning of the discard piles should be carefully managed. The need to properly manage the machines at the dump location can become even more important when the machines are autonomously controlled.

One attempt at managing operations of mobile machines at a dump site is described in U.S. Pat. No. 5,931,875 (the '875 patent) issued to Kemner et al. on Aug. 3, 1999. In particular the '875 patent describes an autonomous vehicle system having a resource manager located at a dump site, and a queue manager located on each of multiple dump trucks. The resource manager is configured to manage each of the dump trucks and acts like a foreman assigning tasks to the trucks and tracking their progress as they perform the tasks The vehicle control system permits autonomous operation of each truck under the control of its queue manager.

When a truck of the '875 patent approaches the dump site, the queue manager sends a queue position request signal to the resource manager. In response to this signal, the resource manager sends a queue position signal back to the queue manager and establishes a queue for entry into the dump site. The truck is then stopped at the queue in a location corresponding to the assigned queue position. The resource manager determines a dump point for the truck that is incrementally offset from a previous dump point, and then determines a route to the dump point. Both the dump point and the route are communicated by the resource manager to the queue manager of the truck. The resource manager then determines when the dump point and a row at the dump site leading to the dump point are available to receive the truck, based on a prior truck being finished dumping and having left the dump row. The resource manager then sends a depart queue position signal to the queue manager. The queue manager sends a leave queue position signal, directs the truck to move to the dump point, and sends an arrive signal to the resource manager after arrival at the dump point and initiation of dumping. After completion of dumping at the dump point, the queue manager sends a dump complete signal to the resource manager, which sends back a depart dump point signal. The queue manager then sends a leave dump point signal to the resource manager and directs the truck to leave the dump point. When the truck leaves the corresponding dump row, the queue manager sends a leave dump row signal to the resource manager. When the truck leaves the dump site, the queue manager sends the resource manager a leave dump site signal. Upon receiving the leave dump site signal, the resource manager determines a future dump point for the next truck in the queue.

Although the system of the '875 patent may help manage trucks in conjunction with a dump site, the system may be less than optimal. That is, the system of the '875 patent may have reduced productivity because of limited simultaneous use of the dump site by multiple trucks. In addition, the system may require the trucks that use the dump site to stop and wait for communications of instructions at many different locations. The time spent communicating instructions back and forth between the queue manager and the resource manager could result in disjointed movement of the trucks that further reduces productivity.

The disclosed control system is directed to overcoming one or more of the problems set forth above and/or other problems of the prior art.

SUMMARY OF THE INVENTION

In one aspect, the present disclosure is directed to a control system for use at a dump location having a plurality of dump sites. The control system may include a control module associated with a mobile machine, and a worksite controller in communication with the control module. The worksite controller may be configured to receive a signal from the control module indicative of the mobile machine crossing a boundary at the dump location, and generate a travel route for the mobile machine based on the signal. The travel route may include a travel segment on a common entrance row, a first single-use path from the common entrance row to a particular one of the plurality of dump sites, a second single-use path from the particular one of the plurality of dump sites to a common exit row, and a travel segment on the common exit row. The worksite controller may be further configured to communicate the travel route to the control module as the mobile machine moves toward the dump location.

In another aspect, the present disclosure is directed to a computer readable medium having computer executable instructions for performing a method of autonomous dump queuing. The method may include receiving an indication of a mobile machine crossing a boundary at a dump location, and assigning a travel route to the mobile machine based on the indication. The travel route may include a travel segment on a common entrance row, a first single-use path from the common entrance row to a particular dump site of a plurality of dump sites at the dump location, a second single-use path from the particular dump site to a common exit row, and a travel segment on the common exit row. The method may also include communicating the travel route to the mobile machine as the mobile machine moves toward the dump location.

DETAILED DESCRIPTION

Figure 1:
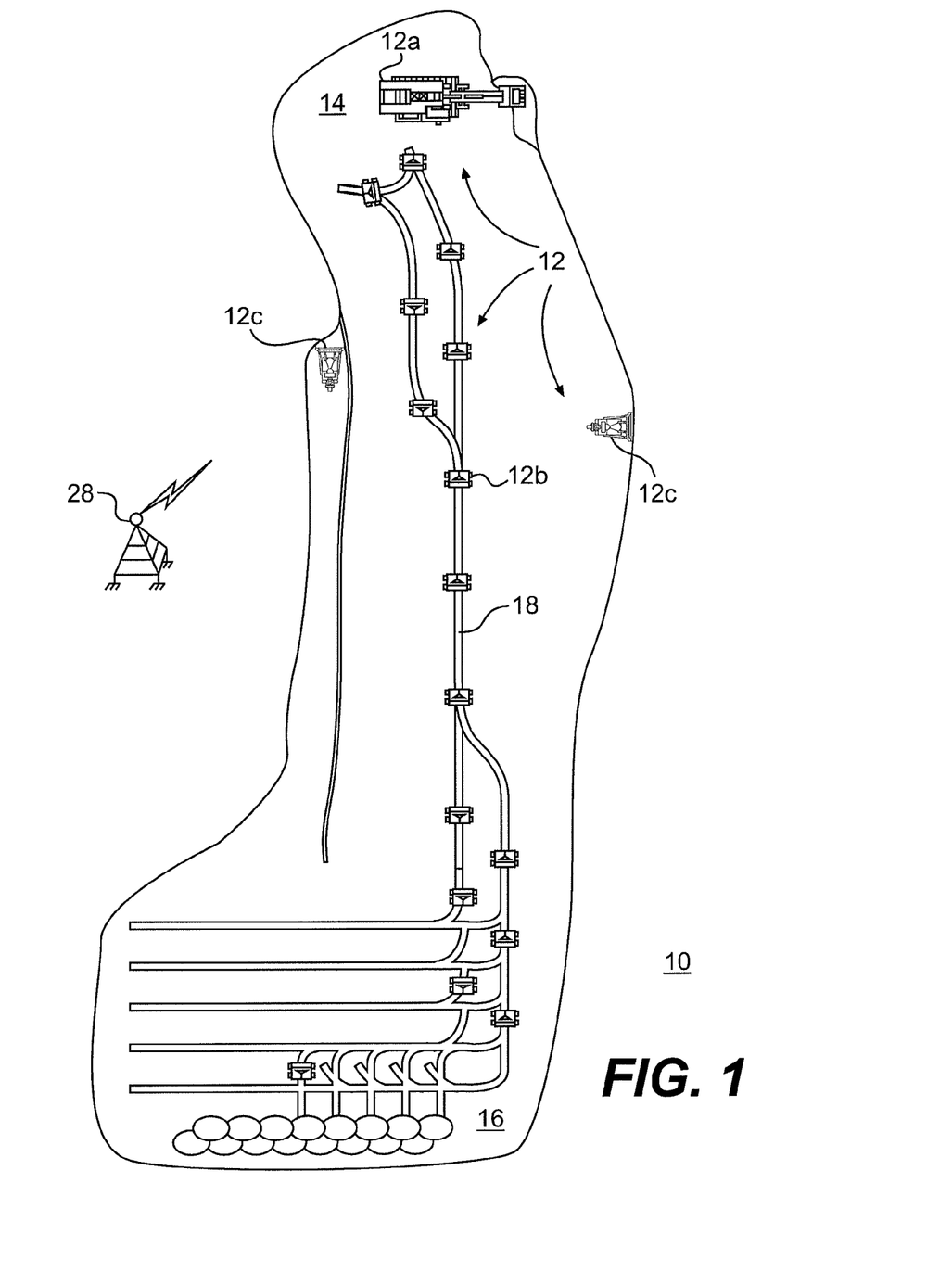
FIG. 1 is a pictorial illustration of an exemplary disclosed worksite.

FIG. 1 illustrates an exemplary worksite 10 having multiple, simultaneously-operable machines 12 performing a variety of predetermined tasks. Worksite 10 may include, for example, a mine site, a landfill, a quarry, a construction site, or any other type of worksite known in the art. The predetermined tasks may be associated with altering the current geography at worksite 10 and include a clearing operation, a leveling operation, a hauling operation, a digging operation, a loading operation, or any other type of operation that functions to alter the current geography at worksite 10.

Worksite 10 may include multiple locations designated for particular purposes. For example, a first location 14 may be designated as a load location at which a mobile loading machine 12a or other resource operates to fill multiple mobile haul machines 12b with material. For the purposes of this disclosure, a resource may be defined as a worksite asset shared by multiple machines for the completion of an assigned task. A second location 16 may be designated as a dump location at which machines 12b discard their payloads. Machines 12b may follow a travel path 18 that generally extends between load and dump locations 14, 16. One or more other mobile dozing or grading machines 12c at worksite 10 may be tasked with clearing or leveling load location 14, dump location 16, and/or travel path 18 such that travel by other machines 12 at these locations may be possible. As machines 12 operate at worksite 10, the shapes, dimensions, and general positions of load location 14, dump location 16, and travel path 18 may change. Machines 12 may be self-directed machines configured to autonomously traverse the changing terrain of worksite 10, manned machines configured to traverse worksite 10 under the control of an operator, or hybrid machines configured to perform some functions autonomously and other functions under the control of an operator. In the disclosed embodiment, at least some of machines 12 at worksite 10 are autonomously controlled.

Figure 2:
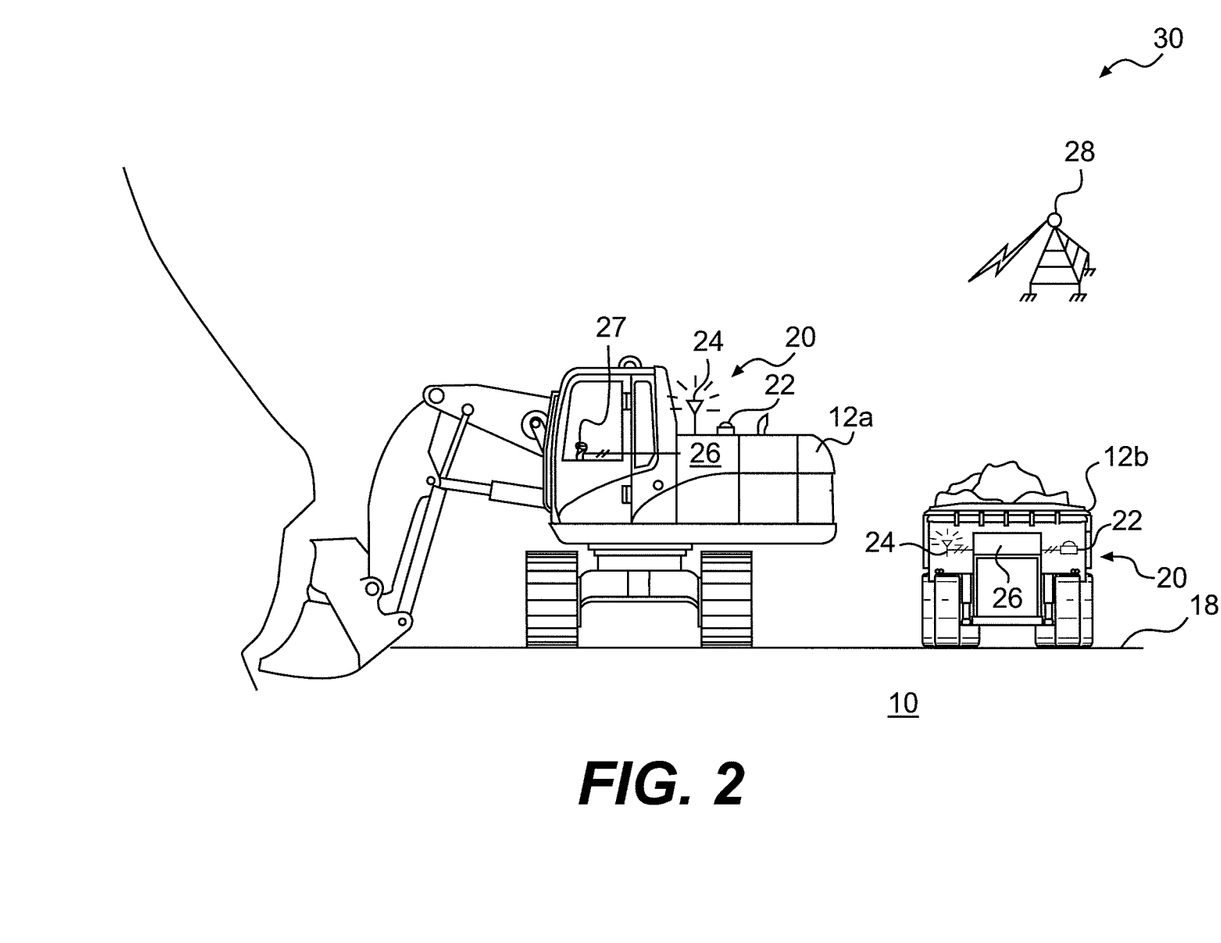
FIG. 2 is a pictorial illustration of an exemplary disclosed control system that may be used at the worksite of FIG. 1.

As shown in FIG. 2, each machine 12 may be equipped with a control module 20 that facilitates or enhances autonomous and/or human control of machine 12. Control module 20 may include, among other things, a locating device 22, a communicating device 24, and an onboard controller (OC) 26 connected to locating device 22 and communicating device 24. When intended for use with a manually operated machine 12, control module 20 may also include one or more operator interface devices 27. Operator interface devices 27 may include, for example, an input device such as a joystick, keyboard, steering wheel, pedal, lever, button, switch, etc. Alternatively or additionally, operator interface devices 27 may include a display device such as a monitor, if desired.

Locating device 22 may be configured to determine a position of machine 12 and generate a signal indicative thereof. Locating device 22 could embody, for example, a Global Positioning System (GPS) device, an Inertial Reference Unit (IRU), a local tracking system, or any other known locating device that receives or determines positional information associated with machine 12. Locating device 22 may be configured to convey a signal indicative of the received or determined positional information to OC 26 for processing. It is contemplated that the location signal may also be directed to one or more of interface devices 27 (e.g., to the monitor) for display of machine location in an electronic representation of worksite 10, if desired.

Communicating device 24 may include hardware and/or software that enables sending and receiving of data messages between OC 26 and an offboard worksite controller (OWC) 28. OWC 28, together with each control module 20 of machines 12, may embody a control system 30. The data messages associated with control system 30 may be sent and received via a direct data link and/or a wireless communication link, as desired. The direct data link may include an Ethernet connection, a connected area network (CAN), or another data link known in the art. The wireless communications may include satellite, cellular, infrared, and any other type of wireless communications that enable communications device 24 to exchange information between OWC 28 and the components of control module 20.

Based on information from locating device 22 and instructions from OWC 28, each OC 26 may be configured to help regulate movements and/or operations of its associated machine 12 (e.g., direct movement of associated traction devices, work tools, and/or actuators; and operations of associated engines and/or transmissions). OC 26 may be configured to autonomously control these movements and operations or, alternatively, provide instructions to a human operator of machine 12 regarding recommended control. OC 26 may also be configured to send operational information associated with components of machine 12 offboard to OWC 28 via communicating device 24, if desired. This information may include, for example, the coordinates of machine 12, a traction device speed and/or orientation, tool and/or actuator positions, status information (e.g., temperatures, velocities, pressures, gear ratios, etc.), and other information known in the art.

OC 26 may embody a single or multiple microprocessors, field programmable gate arrays (FPGAs), digital signal processors (DSPs), etc., that include a means for controlling operations of machine 12 in response to operator requests, built-in constraints, sensed operational parameters, and/or communicated instructions from OWC 28. Numerous commercially available microprocessors can be configured to perform the functions of these components. Various known circuits may be associated with these components, including power supply circuitry, signal-conditioning circuitry, actuator driver circuitry (i.e., circuitry powering solenoids, motors, or piezo actuators), and communication circuitry.

OWC 28 may include any means for monitoring, recording, storing, indexing, processing, and/or communicating various operational aspects of work worksite 10 and machine 12. These means may include components such as, for example, a memory, one or more data storage devices, a central processing unit, or any other components that may be used to run an application. Furthermore, although aspects of the present disclosure may be described generally as being stored in memory, one skilled in the art will appreciate that these aspects can be stored on or read from different types of computer program products or computer-readable media such as computer chips and secondary storage devices, including hard disks, floppy disks, optical media, CD-ROM, or other forms of RAM or ROM.

OWC 28 may be configured to execute instructions stored on computer readable medium to perform methods of travel path planning for machines 12 at worksite 10. That is, as described above, the operation of machines 12 may cause changes to the geography of worksite 10 and, in order for machines 12, particularly those machines that are autonomously controlled, to adapt to the changing geography, travel path plans for machines 12 should also change to keep up with the changes in terrain. OWC 28 may execute instructions to perform a method of planning that generates travel paths 18 for machines 12, and communicates these travel paths 18 to the different control modules 20 for individual implementation.

Figure 3:
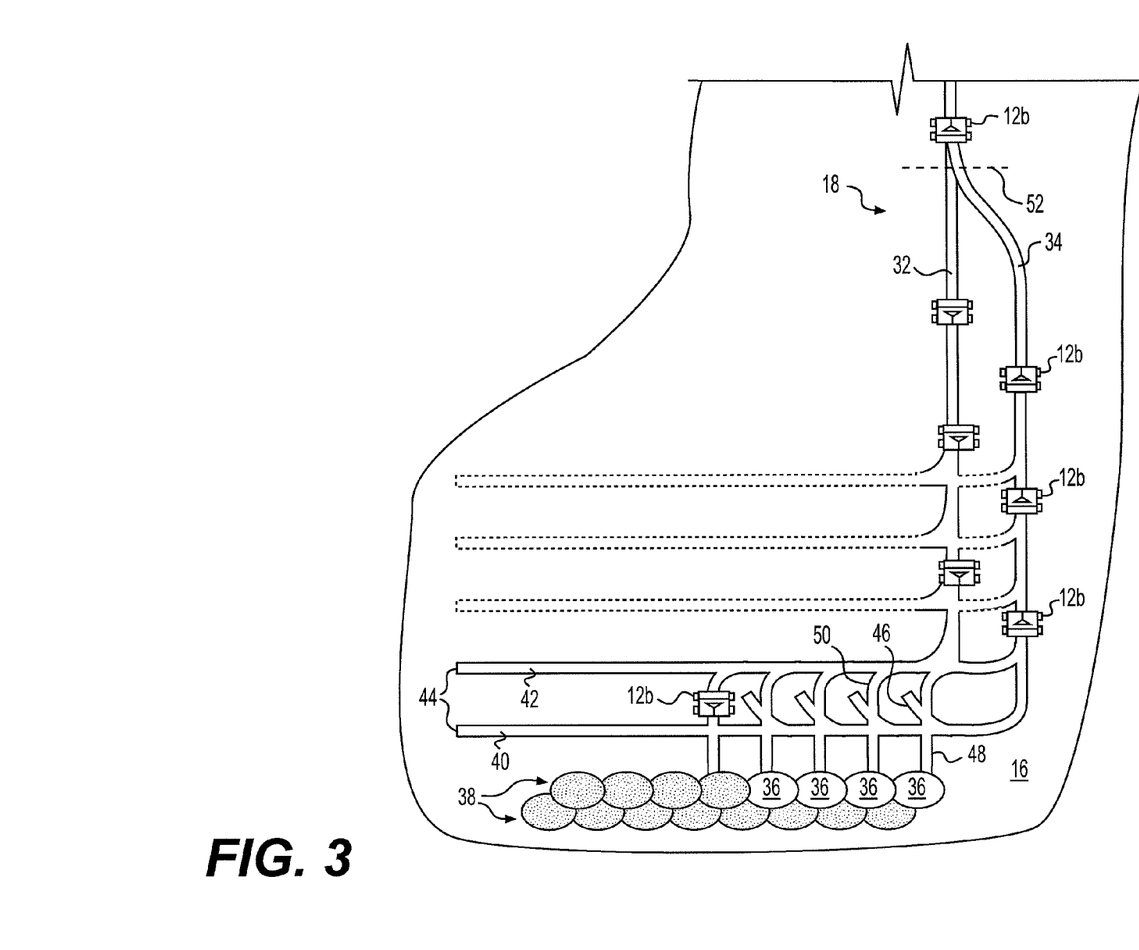
FIG. 3 is a pictorial illustration of a portion of the worksite of FIG. 1.

The disclosed method of travel path planning may be associated with operation of machines 12b at dump location 16. As can be seen in FIG. 3, travel path 18 may be physically separated into a first lane 32 that allows machines 12b to enter dump location 16, and a second lane 34 that allows machines 12b to leave dump location 16 and travel towards load location 14 (referring to FIG. 1). OWC 28 may execute instructions to selectively divide an electronic representation of dump location 16 into a plurality of dump sites 36 and a plurality of travel paths that connect first and second lanes 32, 34 to dump sites 36. As will be explained in more detail below, OWC 28 may then manage movement of each machine 12b along a particular travel path from first lane 32 to one of dump sites 36 and from the dump site 36 to second lane 34, after discard of material at the dump site 36.

The division of dump location 16 into the plurality of dump sites 36 by OWC 28 may be based on site characteristics, machine characteristics, and goals defined by a user of control system 30. The site characteristics considered by OWC 28 may include, among other things, a traversable area at dump location 16, a contour of dump location 16, and a composition of material to be discarded at dump location 16. For example, OWC 28 may consider what shape a predetermined volume of a certain material having a defined amount of moisture may take when deposited at a particular location having a known slope. The machine characteristics considered by OWC 28 may include, among other things, a payload capacity of machines 12b, a size of machines 12b, a turning radius of machines 12b, and output capacities (torque, tractive, etc.) of machines 12b. For example, OWC 28 may consider the weight and/or volume of material that may be deposited at any one time by machines 12b, an extrusion shape that the material may take when discharged from machines 12b, a required spacing between material deposits, and what areas of dump location 16 may be accessible by fully loaded machines 12b. The user-defined goals considered by OWC 28 may include, among other things, a desired depth of material to be deposited at dump location 16 and/or a resulting contour of dump location 16. Based on this information and utilizing one or more algorithms and/or maps stored in memory, OWC 28 may be configured to determine a number, size, and location of each individual dump site 36 at dump location 16 such that a sufficient amount of material may be discarded at accessible and required locations by machines 12b to achieve the user-defined depth and/or contour goals. In the disclosed embodiment of FIG. 3, dump sites 36 are arranged into dump rows 38 that are generally transverse to first and second lanes 32, 34. It is contemplated that dump rows 38 may be straight or curved, as desired.

OWC 28 may generate virtual travel rows in the electronic representation of dump location 16 corresponding with dump rows 38. Specifically, OWC 28 may generate a common entrance row 40 and a common exit row 42. Entrance row 40 may extend from first lane 32 in a direction generally parallel with dump rows 38 and have a length about the same as dump rows 38. Exit row 42 may be located to a side of entrance row 40 opposite dump rows 38, extend generally parallel with entrance row 40, and have a length about the same as entrance row 40. Exit row 42 may be located apart from entrance row 40 by a space 44 that allows a machine 12b traveling on entrance row 40 to move into space 44 for a 3-point turn 46, before backing into an assigned dump site 36. During dumping at dump location 16, after all dump sites 36 of a particular dump row 38 are completely filled with material, exit row 42 may become entrance row 40 and a new exit row 42 closer toward load location 14 (referring to FIG. 1) may be defined in preparation for dumping on a new dump row 38.

OWC 28 may generate virtual single-use travel paths in the electronic representation of dump location 16 that connect entrance and exit rows 40, 42 to individual dump sites 36. In particular, OWC 28 may generate an entrance single-use path 48 and an exit single use path 50 associated with each dump site 36. Each path 48 may extend from entrance row 40 to a particular dump site 36, while each path 50 may extend from a particular dump site 36 to exit row 42. In the disclosed embodiment, a portion of path 50 (i.e., the portion lying between entrance row 40 and dump sites 36) overlaps with path 48. It is contemplated, however, that completely separate single-use paths may be utilized, if desired. It should be noted that, although paths 48 and 50 have been described as being intended for a single-use, it is contemplated that paths 48, 50 may alternatively be utilized as many times as desired for access to a single dump site 36. OWC 28 may determine the shapes, locations, dimensions, and/or curvatures of paths 48 and 50 based on a size of and spacing between dump sites 36 and based on characteristics of machines 12b.

OWC 28 may be triggered to divide dump location 16 into dump sites 36 and the different travel paths to and from dump sites 36 based on any number of different site- and user-related input. For example, when machines 12c (referring to FIG. 1) change (i.e., increase, decrease, or reshape) an accessible area of dump location 16, OWC 28 may be triggered to divide or redivide dump location 16 based on the new size or shape to accomplish the user-defined goals. Similarly, based on a comparison of expected dumping progress (e.g., expected shape, spacing, and/or size of loads dumped by machines 12b) to an actual shape, spacing, and/or size of dumped loads, OWC 28 may be triggered to update characteristics of dump sites 36, entrance row 40, exit row 42, paths 48, and paths 50 to help ensure accomplishment of the user-defined goals. Likewise, when the user-defined goals of material depth and/or contour change, OWC 28 may be triggered to divide or redivide dump location 16.

After dividing dump location 16 into dump sites 36, dump rows 38, entrance row 40, exit row 42, and paths 48 and 50, OWC 28 may execute instructions to regulate the movements of machines 12b relative to different routes that include these rows and travel paths. In the case of autonomously controlled machines 12, control modules 20 of the corresponding machines 12 may be instructed by OCW 28 to direct operations of machines 12 relative to the different rows and travel paths. In the case of manually controlled machines 12, control modules 20 of the corresponding machines 12 may cause routes of the different rows and travel paths to be displayed on the electronic terrain map provided on one of interface devices 27 (e.g., on the monitor of control module 20), with associated instructions for the machine operator. The electronic terrain map may be a compilation of data stored in the memory of OCW 28 and periodically updated with the changes made to dump location 16 and/or the locations of machines 12 provided by corresponding locating devices 22.

Control over the movement of machines 12b at dump location 16 may commence based on a proximity of machines 12b to dump location 16 and/or to dump sites 36. For example, as machines 12b are traveling towards dump sites 36, machines 12b will eventually cross a virtual boundary 52 associated with dump location 16. The precise location of virtual boundary 52 may be set by the user of control system 30 and be associated with an amount of time required for OCW 28 to determine and assign a specific travel route within dump location 16 to a particular machine 12b before that particular machine 12b is required to deviate from a current heading to follow the specified travel route. In the disclosed embodiment, virtual boundary 52 may correspond with the location where lanes 32 and 34 diverge at dump location 16. The location of machine 12b may be tracked by OCW 28 based on signals received from the corresponding control module 20, and compared with the location of virtual boundary 52 as stored in the electronic representation of dump location 16.

Once OCW 28 determines that a particular machine 12b has crossed virtual boundary 52, OCW 28 may determine, assign, and communicate the assigned travel route to that machine 12b. In the disclosed embodiment, no communication requesting assignment of the travel route may be required by machine 12b and machine 12b may also not be required to stop to receive the assignment. In other words, assignment of the travel route may be automatically triggered based simply on the tracked position of machine 12b, and the assignment may be communicated to machine 12b on the fly without causing any disruption in the operation of machine 12b. The particular travel route assigned to a specific machine 12b may include designation of a unique one of dump sites 36, a segment of entrance row 40 associated with dump row 38 of the assigned dump site 36, a segment of exit row 42 associated with dump row 38, the entrance single-use path 48 leading from the entrance row segment to the assigned dump site 36, and the exit single-use path 50 leaving the assigned dump site 36 to the exit row segment.

OCW 28 may track the progress of machine 12 along its assigned route at dump location 16. Specifically, after being assigned a particular travel route to and from a specific dump site 36, machine 12b may be autonomously or manually controlled to follow the route while at the same time providing location information regarding its whereabouts to OCW 28. When OCW 28 detects movement of machine 12b away from the assigned dump site 36 along path 50, OCW 28 may conclude that dumping is complete and mark the assigned dump site 36 in the electronic representation of dump location 16 as no longer available for future dumping (shown as shaded dump sites in FIG. 3).

Although assigned a unique travel route at dump location 16, a particular machine 12b, in some situations, may not have permission to complete travel along the entire route. That is, the layout of dump location 16 may be designed for simultaneous use by multiple machines 12b and, accordingly, it may be possible for one travel route to overlap at some point with another travel route. The overlapping may occur, for example, at entrance and exit rows 40, 42. Accordingly, during the tracking of progress made be different machines 12b along their assigned travel routes, OCW 28 may be configured to determine a potential for collision at an intersection of entrance and/or exit rows 40, 42. When such a potential exists, OCW 28 may give permission to a particular machine 12b for travel along its route only up to a specified point, for example up to an intersection with entrance and/or exit rows 40, 42. If a particular machine 12b reaches the specified point before additional permissions are provided by OCW 28, that machine 12b may be required to stop and wait for the additional permissions before entering the intersection. Once the potential for collision no longer exists (e.g., once another machine 12b has passed by the intersection on entrance or exit rows 40, 42), OCW 28 may provide permission for the particular machine 12b to continue travel along its assigned route up to another point of potential collision. If no potential collisions exist, machine 12b may follow its entire travel route and head back to load location 14 without further communications with OCW 28 (i.e., other than to provide its position).

Industrial Applicability

The disclosed control system may be applicable to a multi-machine operation where the machines repetitively traverse portions of a common travel path. Although applicable to any type of machine, the disclosed control system may be particularly applicable to autonomously controlled machines where the machines are autonomously controlled to follow the travel path. The disclosed system may generate and assign a unique route to each machine for travel along paths to a particuluar dump site based on site characteristics, machine characteristics, and user-defined goals. The disclosed system may provide instructions for controlling each machine along its assigned route, and communicate the instructions on the fly based on tracked machine position.

Because control system 30 may assign and communicate travel route and control instructions on the fly, machine travel may be continuous and efficient. That is, the machines may not be required to stop, request a route, wait for instructions back regarding the route, or confirm completion of each portion of the route. Further, unless a potential collision situation exits, the machines may be permitted to follow the entire route without further delays or communications. In addition to improving an efficiency of machine operations, the number of required communications may be reduced.

It will be apparent to those skilled in the art that various modifications and variations can be made to the disclosed system. Other embodiments will be apparent to those skilled in the art from consideration of the specification and practice of the disclosed system. It is intended that the specification and examples be considered as exemplary only, with a true scope being indicated by the following claims and their equivalents.

What is claimed is:

1. A control system for use at a dump location having a plurality of dump sites, the control system comprising:
   a control module associated with a mobile machine; and
   a worksite controller in communication with the control module, the worksite controller being configured to:
      receive as the mobile machine moves toward the dump location, a signal from the control module indicative of the mobile machine crossing a boundary associated with at the dump location;
      assign a travel route for the mobile machine based on the signal, the travel route including a travel segment on a common entrance row, a first single-use path from the common entrance row to a particular one of the plurality of dump sites, a second single-use path from the particular one of the plurality of dump sites to a common exit row, and a travel segment on the common exit row; and
      communicate the travel route to the control module as the mobile machine continuously moves toward the dump location.

2. The control system of claim 1, wherein the worksite controller is configured to receive the signal, assign the travel route, and communicate the travel route without disrupting movement of the mobile machine toward the dump location.

3. A control system for use at a dump location having a plurality of dump sites, the control system comprising:
   a control module associated with a mobile machine; and
   a worksite controller in communication with the control module, the worksite controller being configured to:
      receive, as the mobile machine moves toward the dump location, a signal from the control module indicative of the mobile machine crossing a boundary associated with at the dump location;

assign a travel route for the mobile machine to a particular one of the plurality of dump sites based on the signal;

communicate the travel route to the control module as the mobile machine continuously moves toward the dump location;

make a determination of an amount of the travel route that he mobile machine is permitted to travel; and communicate a permission to the control module corresponding to the determination.

4. The control system of claim 3, wherein the amount of the travel route that the mobile machine is permitted to travel is based on a location of other mobile machines at the dump location.

5. The control system of claim 4, wherein the amount of the travel route that the mobile machine is permitted to travel corresponds with intersections at the dump location.

6. The control system of claim I, wherein the worksite controller is further configured to:

receive at least one characteristic of the dump location; and determine a number and positions at the dump location of the plurality of dump sites based on the at least one characteristic.

7. The control system of claim 6, wherein the at least one characteristic includes at least one of a size and a shape of an area available for dumping.

8. The control system of claim 7, wherein at least one of the number and positions at the dump location of the plurality of dump sites are determined based further on at least one of a characteristic of material moved by the mobile machine and a characteristic of the mobile machine.

9. The control system of claim 8, wherein:

the characteristic of material includes at least one of a composition and a dump shape; and the characteristic of the mobile machine includes at least one of a size and a turning radius.

10. The control system of claim 9, wherein the clump shape is a shape of a volume of deposited material, and wherein the worksite controller is configured to determine the dump shape based on a contour of the dump location at each of the plurality of dump sites.

11. The control system of claim 6, wherein the worksite controller is further configured to generate the common entrance row, the common exit row, the first single-use path, and the second single-use path based on the at least one characteristic of the dump location and the number and positions of the plurality of dump sites.

12. The control system of claim 11, wherein the common entrance row and the common exit row both correspond with a particular row of the plurality of dump sites.

13. The control system of claim 12, wherein:

when dumping on the particular row of the plurality of dump sites is complete, the common entrance row becomes the common exit row; and the worksite controller is configured to generate a new common exit row.

14. The control system of claim 11, wherein the worksite controller is further configured to direct multiple mobile machines to simultaneously use the common entrance and common exit rows.

15. The control system of claim 14, wherein the worksite controller is further configured to track positions of each of the multiple mobile machines.

16. The control system of claim 15, wherein the worksite controller is further configured to:

make a comparison of an expected shape and spacing of loads dumped by the multiple mobile machines to an actual shape and spacing of loads; and selectively update a position of at least one of the plurality of dump sites, the common entrance row, the common exit row, the first single-use path, and the second single-use path based on the comparison.

17. A non-transitory computer readable medium having computer executable instructions for performing a method of autonomous dump queuing, the method including:

receiving an indication of a mobile machine crossing a boundary associated with a dump location as the mobile machine moves toward the dump location;

assigning a travel route to the mobile machine based on the indication, the travel route including a travel segment on a common entrance row, a first single-use path from the common entrance row to a particular dump site of a plurality of dump sites at the dump location, a second single-use path from the particular dump site to a common exit row, and a travel segment on the common exit row; and communicating the travel route to the mobile machine as the mobile machine continuously moves toward the dump location.

18. The non-transitory computer readable medium of claim 17, wherein the method includes receiving the indication, assigning the travel route, and communicating the travel route without disrupting movement of the mobile machine towards the dump location.

19. A non-transitory computer readable medium having computer executable instructions for performing a method of autonomous dump queuing, the method including:

receiving an indication of a mobile machine crossing a boundary associated with a dump location as the mobile machine moves toward the dump location;

assigning a travel route to the mobile machine based on the indication, the travel route directing the mobile machine to a particular dump site of a plurality of dump sites at the dump location;

communicating the travel route to the mobile machine as the mobile machine continuously moves toward the dump location;

making a determination of an amount of the travel route that the mobile machine is permitted to travel; and communicating a permission to the mobile machine corresponding to the determination.

20. The non-transitory computer readable medium of claim 19, wherein the amount of the travel route that the mobile machine is permitted to travel is based on at least one of a location of other mobile machines at the dump location and intersections at the dump location.

21. The non-transitory computer readable medium of claim 17, wherein the method further includes:

receiving at least one characteristic of the dump location; and determining a number and positions at the dump location of the plurality of dump sites based on the at least one characteristic.

22. The non-transitory computer readable medium of claim 21, wherein responsively determining the number and positions at the dump location of the plurality of dump sites includes determining the number and positions at the dump location of the plurality of dump sites based further on at least one of a characteristic of material moved by the mobile machine and a characteristic of the mobile machine.

23. The non-transitory computer readable medium of claim 22, wherein:

the characteristic of material includes at least one of a composition and a dump shape; and the characteristic of the mobile machine includes at east one of a size and a turning radius.

24. The non-transitory computer readable medium of claim 21, wherein the method further includes generating the common entrance row, the common exit row, the first single-use path, and the second single-use path based on the at least one characteristic and the number and positions of the plurality of dump sites.

25. The non-transitory computer readable medium of claim 24, wherein:

the common entrance row and the common exit row both correspond with a particular row of the plurality of dump sites;

when dumping on the particular row of the plurality of dump sites is complete, the common entrance row becomes the common exit row; and the method further includes generating a new common exit row.

26. The non-transitory computer readable medium of claim 24, wherein the method further includes:

making a comparison of an expected shape and spacing of loads dumped by multiple mobile machines to an actual shape and spacing of loads; and selectively updating a position of at least one of the plurality of dump sites, the common entrance row, the common exit row, the first single-use path, and the second single-use path based on the comparison.

27. A non-transitory computer readable medium having computer executable instructions for performing a method of autonomous dump queuing, the method including:

receiving at least one characteristic of a dump location; and responsively determining a number and positions at the dump location of a plurality of dump sites based on the at least one characteristic;

assigning a common entrance row, a plurality of first single-use paths from the common entrance row to particular dump sites of a plurality of dump sites at the dump location, a common exit row, and a second plurality of single-use paths from the particular dump sites to the common exit row;

receiving an indication of a mobile machine crossing a boundary associated with the dump location as the mobile machine moves toward the dump location:

assigning a travel route to the mobile machine based on the indication, the travel route including a travel segment on the common entrance row, one of the first plurality of single-use paths, one of the second plurality of single-use paths, and a travel segment on the common exit row;

communicating the travel route to the mobile machine as the mobile machine continuously moves toward the dump location;

making a determination of an amount of the travel route that the mobile machine is permitted to travel; and communicating a permission to the mobile machine corresponding to the determination.

28. The non-transitory computer readable medium of claim 27, wherein the amount of the travel route that the mobile machine is permitted to travel is based on at least one of a location of other mobile machines at the dump location and intersections at the dump location.

29. The non-transitory computer readable medium of claim 27, wherein:

the common entrance row and the common exit row both correspond with a particular row of the plurality of dump sites; and when dumping on the particular row of the plurality of dump sites is complete, the common entrance row becomes the common exit row and the method further includes generating a new common exit row.

30. The non-transitory computer readable medium of claim 27, wherein the method further includes:

making a comparison of an expected shape and spacing of loads dumped by multiple mobile machines to an actual shape and spacing of loads; and selectively updating a position of at least one of the plurality of dump sites, the common entrance row, the common exit row, the first plurality of single-use paths, and the second plurality of single-use paths based on the comparison.

* * * * *

UNITED STATES PATENT AND TRADEMARK OFFICE
CERTIFICATE OF CORRECTION

| | | |
|---|---|---|
| PATENT NO. | : 8,983,707 B2 | Page 1 of 1 |
| APPLICATION NO. | : 13/198380 | |
| DATED | : March 17, 2015 | |
| INVENTOR(S) | : Everett et al. | |

It is certified that error appears in the above-identified patent and that said Letters Patent is hereby corrected as shown below:

In the Specification:

Column 1, line 43, delete "tasks" and insert -- tasks. --.

Column 8, line 1, delete "Industrial Applicability" and insert -- INDUSTRIAL APPLICABILITY --.

Column 8, line 10, delete "particuluar" and insert -- particular --.

In the Claims:

Column 8, line 40, In Claim 1, delete "receive" and insert -- receive, --.

Column 8, line 43, In Claim 1, after "with" delete "at".

Column 8, line 67, In Claim 3, after "with" delete "at".

Column 9, line 8, In Claim 3, delete "he" and insert -- the --.

Column 9, line 19, In Claim 6, delete "claim I," and insert -- claim 1, --.

Column 9, line 39, In Claim 10, delete "clump" and insert -- dump --.

Column 11, line 3, In Claim 23, delete "east" and insert -- least --.

Column 12, line 3, In Claim 27, delete "location:" and insert -- location; --.

Signed and Sealed this
Twenty-sixth Day of July, 2016

Michelle K. Lee
*Director of the United States Patent and Trademark Office*